April 14, 1953 R. W. CLAUSS 2,634,852
TRANSFERRING DEVICE FOR BUTTER BARS AND SIMILAR PRODUCTS
Filed July 9, 1951 4 Sheets-Sheet 1
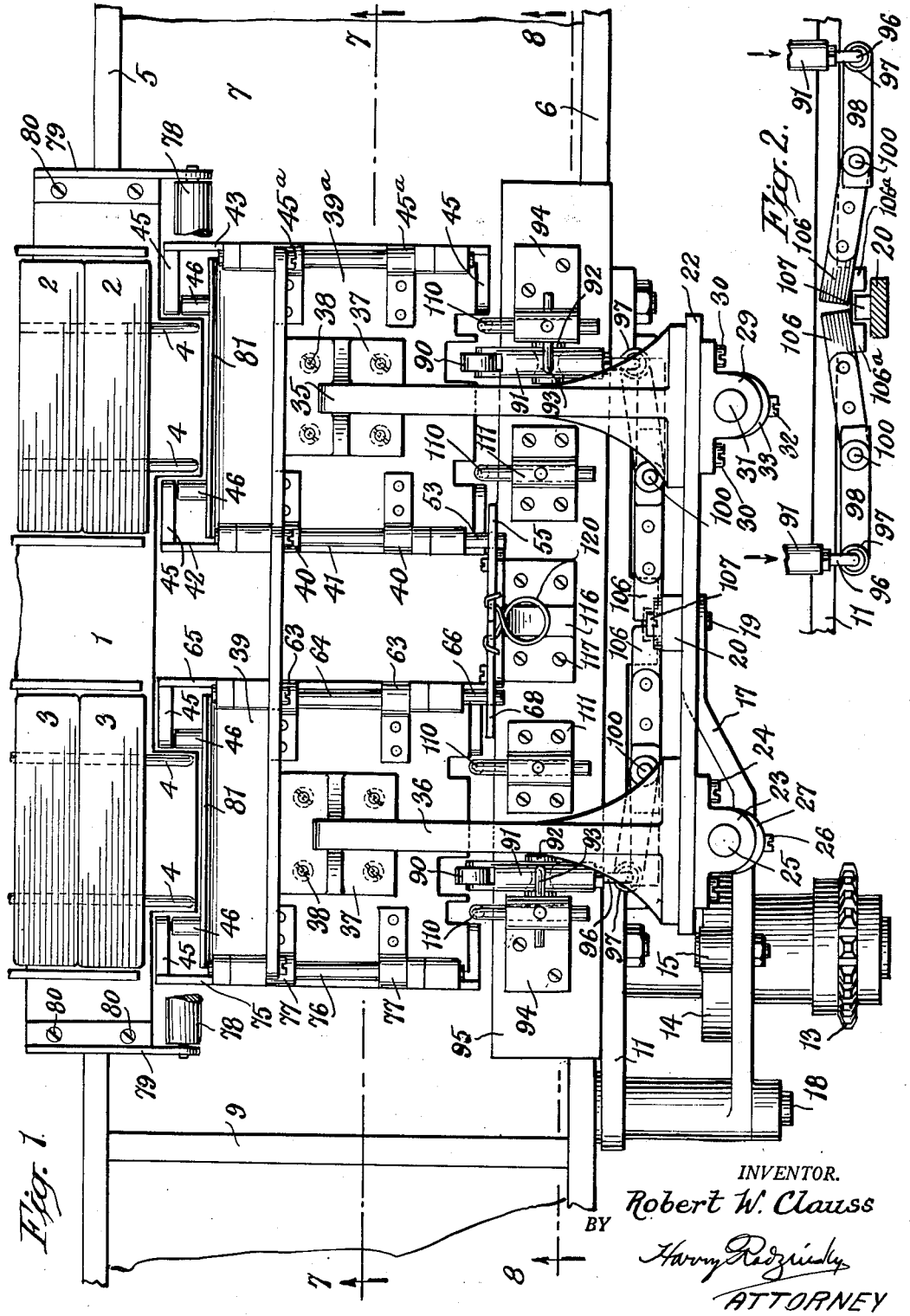
INVENTOR.
Robert W. Clauss
BY
Harry Radzinsky
ATTORNEY

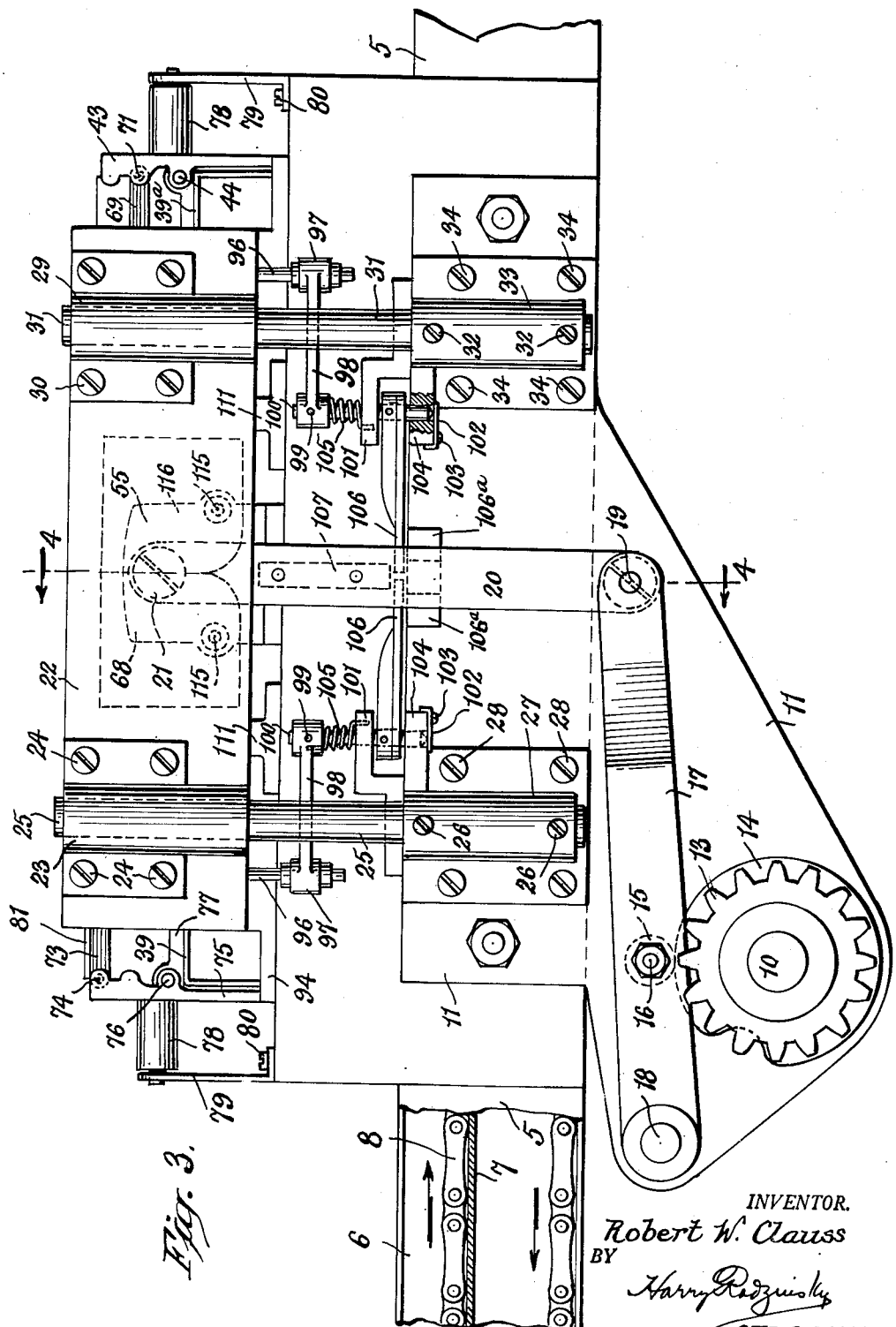

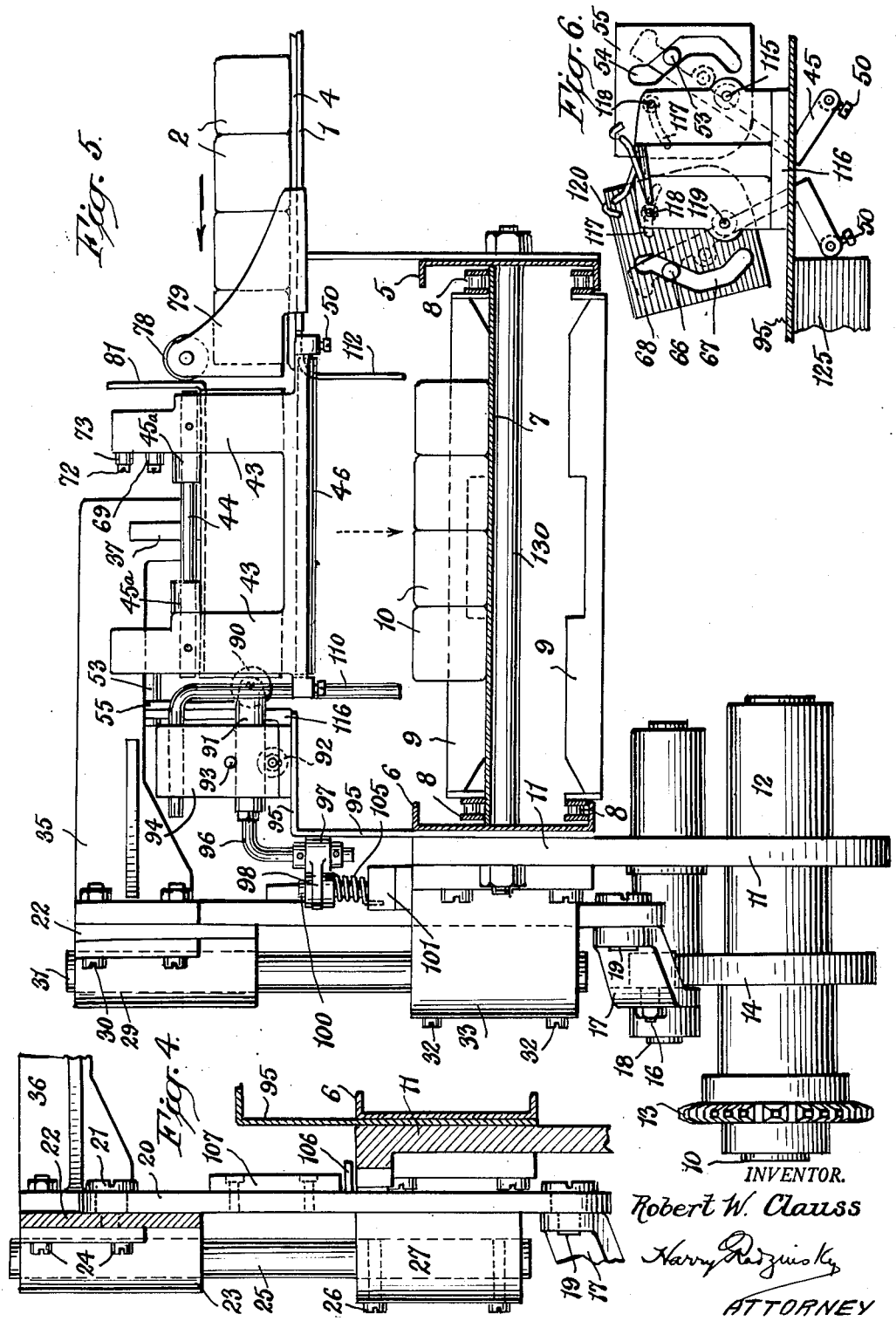

April 14, 1953  R. W. CLAUSS  2,634,852
TRANSFERRING DEVICE FOR BUTTER BARS AND SIMILAR PRODUCTS
Filed July 9, 1951  4 Sheets-Sheet 4
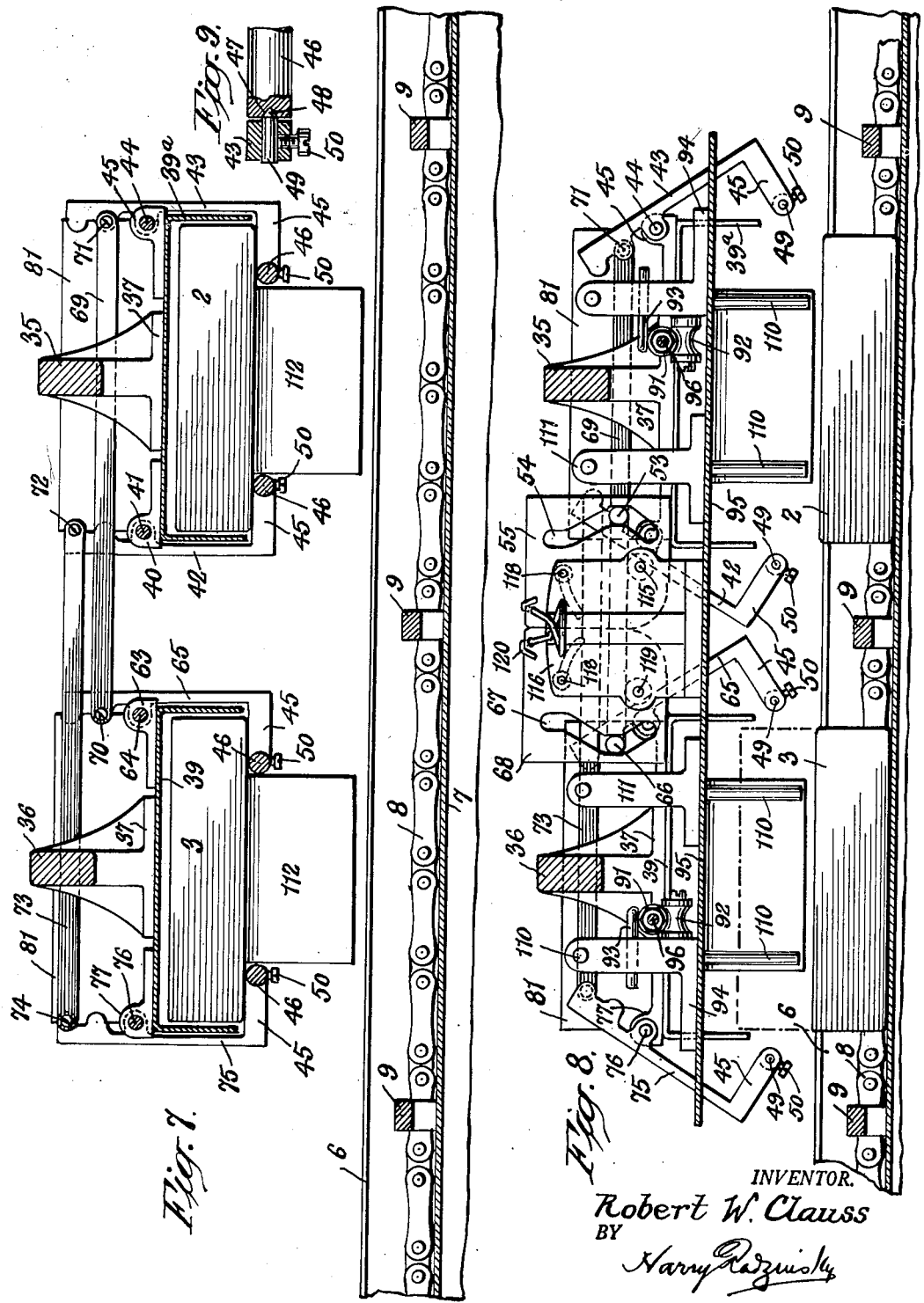
INVENTOR.
Robert W. Clauss
BY
Harry Radzinsky
ATTORNEY Patented Apr. 14, 1953

2,634,852

UNITED STATES PATENT OFFICE 2,634,852

TRANSFERRING DEVICE FOR BUTTER BARS AND SIMILAR PRODUCTS

Robert W. Clauss, New York, N. Y., assignor to Breakstone Bros., Inc., New York, N. Y., a corporation of Delaware Application July 9, 1951, Serial No. 235,761

14 Claims. (Cl. 198—20)

This invention relates to handling or transferring devices for products, such as, for example, bars of butter, lard, oleomargarine, and many other relatively soft and compressible products which require care and sanitation in handling and conveying from their point of production to the final placement of the same in boxes or other enclosures.

Bars of butter and other products usually emerge enclosed in wrappers from a wrapping machine, and they are then transported, usually by a chain conveyor, to a point where they are placed in boxes in groups of predetermined number. It is therefore desirable to remove the wrapped bars in groups of predetermined number from the initial conveying means and to deliver such groups to another conveyor which maintains the bars in their grouped arrangement and carries them to the packaging station.

It is an object of the present invention to provide an apparatus which will successively remove groups of the bars, with a predetermined number of bars in each group, from a line of the wrapped bars that is moved along by conveying means, and deposit these selected groups of bars on a second conveyor moving at right angles to that from which the bars were taken.

It is a further object of the invention to provide an apparatus which will so handle the wrapped bars and deposit them on the second conveying means in a manner which will not mar, damage or compress the bars nor damage or deface the wrappings thereon, but on the other hand will serve to insure the proper positioning of the wrappers, particularly at the end portions of the bars.

It is still another object of the invention to provide in a machine of this character, means by which clogging, displacement of the bars, or the deposit of bars on top of one another, will be effectively prevented by safeguards insuring operation only when a predetermined number of the bars is in position for proper transference from the first conveying means to the second conveying means.

It is still another object of the invention to provide a depositing means for a predetermined number of the bars, whereby such means will receive the predetermined number of bars while such means is in an elevated position, and will then descend, release the bars and then ascend to an elevated position in readiness for another charge of bars, with means provided by which a complete descent of the carrier and a release or deposit of any one charge of bars will be prevented when the charge is less in number than a definite, predetermined amount. The invention also contemplates the provision of means by which operation of the carrier will be prevented when clogging or an incomplete release of the bars occurs.

More particularly, the invention contemplates the provision of a conveyor over which a vertically reciprocable carrier is located, with the carrier having means for receiving a predetermined number of bars when it reaches the upper end of its stroke, and then descends to deposits the bars on the continuously moving conveyor located below it, with means provided by which the carrier will not permit complete descent of the carrier to deposit its charge of bars in the event that there is not a predetermined number of the bars on the carrier when the same attempts to descend. The invention contemplates other objects and features to be more particularly pointed out hereinafter and set forth in the claims appended hereto.

In the accompanying drawings, wherein an illustrative embodiment of the invention is disclosed, Fig. 1 is a top plan view of the improved mechanism;

Fig. 2 is a plan view, with parts in section of the means by which descent of the carrier is prevented when an insufficient number of bars is carried by the same;

Fig. 3 is a rear view of the improved mechanism;

Fig. 4 is a sectional view, taken on the line 4—4 of Fig. 3, looking in the direction of the arrows;

Fig. 5 is an end view of the mechanism, looking from the right of Fig. 3;

Fig. 6 is a view showing the action of the slotted cam plates when a butter bar is in a position to prevent operation of said plates on the carrier arms;

Fig. 7 is a sectional view taken on the line 7—7 of Fig. 1, looking in the direction of the arrows;

Fig. 8 is a sectional view, taken on the line 8—8 of Fig. 1, looking in the direction of the arrows, and Fig. 9 is a detail view showing the mounting for the butter bar supporting rods on the carrier.

In herein referring to the articles upon which the improved mechanism operates, as "butter bars," it will be understood that such term is illustratively used since the articles carried may be almost any elongated, rectangular articles, although the present mechanism has in mind the handling, wholly without damage or defacement, of articles which are relatively soft or compressible and which generally have the characteristics of butter bars. Hence, when herein referring to the articles as "butter bars" I wish to be understood as meaning almost any article which can be handled and conveyed in the manner hereinafter described.

The butter bars which are handled by the apparatus, are moved to the handling device by a continuously-operated conveyor of the known type, toward the entrance to the present structure, and upon leaving the said conveying means are moved along a support generally indicated at 1. The present apparatus contemplates the handling of two parallel rows of butter bars, and each of the two sections of the apparatus receives four of the bars at a time from the support, and descends with the four bars, so that there is a deposit of eight bars on a second conveyor each time that the carrier descends. The bars in the two rows being fed to the carrier are respectively indicated at 2 and 3. The support 1 is provided on its upper face with smooth, rounded strips or ribs 4 on which the bars 2 and 3 rest and along which the same are moved with a minimum of friction.

The frame of the apparatus includes a pair of spaced channel bars 5 and 6 connected by the lengthy metal plate 7 forming the support for the upper stretch of the conveyor chain 8, and also forming the support along which the deposited bars, indicated at 10, are moved by the upper stretch of the conveyor chain 8. The chain 8 is provided with spaced partition members 9 which engage the butter bars 10 and move the same from below the point of deposit, or to the right as viewed in Fig. 3. The channel members 5 and 6 are maintained in spaced and parallel relation by the cross rods 130.

Forming part of the frame of the apparatus is a bracket 11 in which a shaft 10 is rotatively mounted in a suitable bearing 12, said shaft 10 carrying a sprocket 13, driven by a chain, not shown, from a suitable power source and at the proper speed and in timed relation to other parts of the apparatus. Also mounted on the shaft 10 is a cam 14, against the periphery of which is arranged a roller 15 on a spindle 16 carried by a lever 17. The lever 17 is pivoted at one end, as indicated at 18, on the bracket 11 and has its opposite end pivotally connected at 19 to the lower end of a vertically-reciprocated link 20 which has its upper end pivotally connected at 21 to a plate 22 forming a rear part of the carrier. Secured to the back of the plate 22 by the screws 24 is a guide 23 which rides up and down on a vertical post 25 having its lower end portion held by the screws 26 in a boss 27 attached by the screws 28 to the upper portion of the bracket 11. Also attached to the plate 22 by screws 30, is a second guide member, indicated at 29, which is guided in its up and down movement by a vertical post 31 which has its lower end portion secured by the screws 32 in the boss 33 that is fastened by the screws 34 to the upper portion of the bracket 11. This arrangement is such that by means of the described cam mechanism, a vertical reciprocating movement is imparted to the plate 22 and the carrier connected thereto.

Secured to the plate 22 and projecting laterally and forwardly therefrom is a pair of arms, indicated respectively at 35 and 36. Each of the arms 35 and 36 terminates at its outer end in a foot 37 attached by the screws 38 to a housing 39 or 39a forming a covering over the tops and ends of the butter bars as they are borne by the carrier. It will be noted, particularly in Fig. 7, that there are two of these housings indicated respectively at 39 and 39a under each of which four bars are carried on each descent of the carrier. The carrier is thus in two units, and the one having housing 39a will now be described.

Secured on top of the housing 39a is a pair of bearings 40, and mounted for oscillatory movement in said bearings 40 is a shaft 41 on which the butter-bar supporting arm indicated at 42 is mounted. A companion butter-bar supporting arm 43 is mounted on a rocking shaft 44 arranged in the bearings 45a secured on top of the housing 39a adjacent to the opposite side thereof. The arm 42 is provided with two inturned ends 45 and rotatively supported between the two ends 45 is a free-turning rod or roller 46. It will be noted from Fig. 9 that each of the ends of the rod or roller 46 is formed with a recess 47 which fits the conical end or tip 48 of a pin 49 held by a set screw 50 in the end 45 of each of the ends 45. This arrangement is such that the rod or roller 46 is supported between the two arm-ends 45, but may freely rotate. The arm 43 is similar to that shown at 42 and has a roller 46 rotatively held between the inwardly-directed end portions 45 as described in connection with the arm 42.

Located on the arm 42 above the pivotal point 41 thereof, is a laterally projecting pin 53 disposed in a cam slot 54 formed in a pivotally-mounted cam plate 55, the operation of which will be presently described. It is sufficient to state at this point that as the carrier is raised and lowered, the slot 54 will cause the arm 42 to be pivotally swung as required to effect the carrying as well as the deposit of the butter bars supported on the rods 46.

Referring now to the second unit of the apparatus, or that provided with the housing 39, and which is similar to the unit just described. This housing is provided at the top near one side with the bearings 63 maintaining a rocking shaft 64 on which the arm 65 is mounted. Said arm corresponds in construction to that shown at 43 on the first unit, and the arm 65 is provided with a lateral pin 66 extending through a cam slot 67 formed in a pivoted cam plate 68.

The arm 65 is connected at 70 to one end of a link 69 which has its opposite end connected at 71 to the arm 43. It will be obvious that through this connection, any pivotal movement imparted to the arm 65 by the cam slot 67 will also be imparted to the arm 43. It will be noted that the arm 42 is connected at 72 to one end of a link 73 which has its opposite end connected at 74 to the arm 75 mounted on a shaft 76 which oscillates in bearings 77 secured on top of the housing 39. Thus, as arm 42 is pivotally moved by the pin 53 moving in the cam slot 54, the arm 75 will be similarly moved.

When the carrier is in its elevated position, or that shown in Fig. 5, the butter bars indicated at 2 and 3 moving along the supporting rails 4 in the direction of the arrow seen in Fig. 5, enter the carrier units in two groups of four bars each. At the entrance to the carrier is located a lengthy roller 78, freely rotative in brackets 79 secured to the opposite ends of the support 1 by the screws 80 and projecting upwardly from the support. This roller 78 restrains the butter bars from any tendency to rise upwardly on the upward ascent of the carrier. At its forward end, each of the housings 39 and 39a is formed with an upwardly-directed flange 81 which prevents the bars from being urged into or toward the carrier when the carrier is in its lowered or depositing position. When four bars have entered under each of the housings 39 and 39a and are positioned on the rods 46 of the arms 42, 43, 65 and 75, the carrier has then received its load and it begins its descent and as it moves downwardly and reaches a point closely adjacent to the plate 7 over which the conveyor chain 8 moves, the cam slots 54 and 67 acting on pins 53 and 66 will swing the arms 42, 43, 65 and 75 apart or to open position, or that shown in Fig. 8, causing the eight butter bars then held by the arms to be dropped down on the plate 7 between the partitions 9 of the conveyor. As the carrier then descends for a slightly additional distance, the cam slots 54 and 67 cause the arms to be brought together for a short distance to cause the rollers 46 to lightly contact the ends of the bars, serving to not only align the four bars in each row, but to effectively smooth out any slightly projecting wrapper-ends on the bars. As the carrier is then elevated, the arms will spread apart and then move toward one another, so that when the carrier reaches its elevated position, the arms are then in their closed or retracted positions shown in Fig. 7 in readiness to receive the next charge of butter bars.

It is desirable that each time that the carrier descends, it shall convey for deposit on the conveyor a predetermined number of bars, namely, four in each unit, and therefore to prevent the deposit of less than such predetermined number, a safeguard now to be described is provided. Located at the rear of the housing 39 is a roller 90 rotatively mounted in a holder 91 held against a grooved roller 92 by a pin 93 extending laterally from a bracket 94 mounted on a plate 95 forming a part of the frame structure of the machine. The holder 91 is provided at its rear end with a downwardly-bent stem 96 received in a boss 97 provided at one end of a lever 98. Lever 98 has its opposite end secured at 99 (Fig. 3) to the upper end of a spindle 100 rotative in a bracket 101 mounted on the top of the bracket 11. The lower end of the spindle 100 is resiliently supported by contact with a leaf spring 102 secured by a screw 103 to a lug 104 extending from the boss 27. This arrangement permits a limited axial movement to the spindle 100. A torsional spring 105 is disposed around the spindle 100 and has one end in engagement with the lever 98 and its other end in engagement with the bracket 101, said spring serving to normally hold the spindle in a position where a finger 106 secured to it, will be disposed in the path of downward movement of a block 107 secured on the face of the link 20, and thus while said finger 106 is so located it will prevent the descending movement of link 20 and the carrier to which said link is connected.

When four butter bars are moved into a unit of the carrier, the innermost bar of the four will be brought into contact with the roller 90 which constitutes a feeler and said bar will exert sufficient pressure against the roller to move the roller 90 and its carrier 91 rearwardly or in the direction of the arrow in Fig. 2, to thereby rotate the spindle 100, against the urge of the torsional spring 105, in a manner to cause the finger 106 to be moved inwardly and out of the path of the block 107 so that the link 20 can then descend to bring the carrier down to depositing position. It is thus apparent that whenever the carrier starts its descent with less than the predetermined number of four bars in place, insufficient pressure will be imposed on the feeler mechanism above described and the finger 106 will in such case constitute an obstruction which will prevent descent of the carrier and also prevent the deposit of the bars then being carried, because the carrier will not have descended to a sufficient extent to cause the cam slots 54 and 67 to become effective to spread the bar-carrying arms to open position.

The bracket 11 is provided with a projecting block 106a slotted to permit passage of block 107, and arranged to act as a support or backing member for the finger 106 when said finger is downwardly depressed by being located in the path of descent of block 107. The leaf spring 102, allowing a limited axial movement of the spindle 100, thus permits the finger 106 to be moved downwardly by pressure of block 107 to the required extent to enable the finger to be supported by block 106a.

When the link 20 ascends, and pressure of the block 107 is removed from finger 106, leaf spring 102 will slightly raise spindle 100 and thus friction between finger 106 and the top of the block 106a will be relieved and the spindle 100 be free to turn easily.

I have described the feeler mechanism in conjunction with one of the units only, namely, that of which the housing 39 forms a part. However, as will be apparent from Figs. 1, 2, 3 and 8, the second unit, or that having the housing 39a is similarly provided with the feeler means described and to the parts thereof the same reference numerals are applied. It will be observed, and particularly from Fig. 2, that only one of the fingers 106 is required to be positioned in the downward path of the block 107 to prevent the descent of the carrier. Hence, when an insufficient number of the bars is located in either of the carrying units, the descent of the carrier will be prevented and no bars will be deposited from either unit.

To facilitate the accurate and aligned deposit of the bars from the carrier onto the conveyor, vertical guide rods 110 are provided at the rear of the device, such rods being supported in the brackets 94 and 111 secured on the plate 95. At the front, the bars are guided by the aprons 112.

In addition to the safeguard which prevents the deposit of less than the predetermined number of bars, another safeguard is provided. This consists of a means which renders the cam slots 54 and 67 ineffective to cause closing movement of the carrier arms 42, 43, 65 and 75 in cases when one or more of the butter bars should fail to become deposited on the conveyor 7, 8. For various reasons, there is the possibility that one or more of the bars might wedge or jam or become adherent to parts of the carrier and thus might fail to drop onto the conveyor upon opening movement of the carrier arms. It is also possible that an obstruction on the conveyor might fail to permit release of all of the bars. In such case, the situation pictured in the left portion of Fig. 6 will exist.

In Fig. 6 it will be noted that the slotted cam plate 55 is pivotally mounted at 115 on a bracket 116, secured by the screws 117 to the base plate 95. The cam plate 55 thus has a limited swinging movement on its pivot 115, such movement being limited by means of an arcuate slot 117 provided in the plate 55 and which is engaged by a screw 18 extending from bracket 116. Similarly, the companion cam plate 68 is pivoted at 119 in the bracket 116 and is also provided with an arcuate slot 117 engaged by a screw 118. The two cam plates 55 and 68 are normally drawn together into abutment and are so maintained in their operative position seen in Fig. 8, by means of a wishbone spring 120. When a charge of four butter bars is carried by each unit of the carrier and the carrier descends, the cam slots 54 and 67, operative upon the pins 53 and 66, will cause the arms of the carrier to open, then slightly close, and then as the carrier rises, will open the arms and then close them adjacent to the upper end of the rising movement of the carrier. If on the depositing movement of the arms, one or more bars should fail to drop down on the conveyor, the pressure of the end of that bar or bars, indicated at 125 in Fig. 6, on the arms of the carrier will be greater than the pressure imposed by the wishbone spring 120 required to hold the two plates 55 and 68 together or in the operative position of Fig. 8. Therefore, as the carrier rises the two cam plates 55 and 68 will be simply pivotally swung apart and the carrying arms held in open position until the offending butter bar is removed. In other words, in this contingency the carrier arms will move the cam plates instead of the cam plates controlling the movements of the arms. In Fig. 6 of the drawing, the plate 68 is shown in the angular position to which it is swung when a butter bar is improperly in place, while the plate 55 is in the operative position. Actually, the device is never in this condition, since both plates are either in the closed position of Fig. 8 or else both are spread apart as above described. The illustration is used to indicate relative positions of the plates.

From the foregoing, the operation of the improved butter bar handling device will be readily understood. The butter bars are moved by a double conveyor in the two lines 2 and 3 and pass along the rails 4, and when the carrier is in its raised position of Fig. 5, two groups of four bars each, will be delivered into the two units of the carrier and come to rest on the supporting rods 46 of the several carrier arms 42, 43, 65 and 75. As the proper number of bars enter each unit of the carrier, they will contact the feeler rollers 90 and the pressure of the bars will shift the fingers 106 out of the path of the block 107 on the link 20. The carrier then begins its descent and as it nears the limit of its descending movement, the arms 42, 43, 65 and 75 are spread apart by the action of the cam slots 54 and 67 on the pins 53 and 66, causing the butter bars then supported on the rods 51 to drop down onto the plate 7 between the partition members 9 of the conveyor 8 that is then in a position of halt. The arms of the carrier then come together slightly to lightly contact the ends of the bars to align the bars and also to smooth the wrapper ends thereon, and then as the carrier rises, the arms spread apart, fully releasing the bars, and then come together above the bars and so remain until the next charge of bars is delivered to the carrier. During the rising movement of the carrier, the conveyor 8 moves the deposited bars away, carrying them in a direction at right angles to that in which they were initially brought to the machine, and retaining them in separated groups of four bars in each group.

Should an insufficient number of bars be fed to either of the units of the carrier, the feeler mechanism, terminating in the rollers 90, will not operate to move one or the other of the abutment fingers 106 out of the path of the block 107 so that the carrier will not descend until the deficiency is corrected. Also should one or more of the butter bars fail to be deposited on the descent of the carrier, but should remain in place in the carrier, the cam plates 55 and 68 will be pivotally urged into inoperative position against the pressure of the spring 120 and the carrier arms will not be moved by the cam plates until the clogging bar is taken out.

Having described one embodiment of the invention, it is obvious that the same is not to be restricted thereto but may be varied without departing from the spirit of the invention. For example, while the device as shown is arranged with two units to each receive a charge of four bars, it will be apparent that the device can be readily arranged with more or less units and can be operated to handle the bars in groups of more or less than four. Other changes are contemplated as being within the scope of the claims appended hereto.

What I claim is:

1. In an apparatus for handling relatively soft products in bar form, a conveyor, an article-carrier located above the conveyor and vertically movable to and from the same, article-supports on said carrier disposed in article-receiving position when the carrier is in a raised position away from the conveyor, means for separating the article-supports as the carrier nears the conveyor to thereby cause said supports to deposit the articles on the conveyor, said last-mentioned means acting to bring the article-supports toward one another directly after the deposit of the articles and while said article supports are adjacent to the ends of the deposited articles to thereby cause the said supports to apply a wiping action against the ends of the deposited articles.

2. In an apparatus for handling products in bar shape, a vertically-reciprocated article-carrier, pivoted article supports on said carier, a conveyor movable below the carrier, means for vertically reciprocating the carrier to and from the conveyor, means for pivotally moving the article-supports to cause the same to deposit articles held by them on the conveyor, and means for preventing complete lowering movement of the carrier if the carrier attempts to descend with less than a predetermined number of articles on said carrier.

3. In a transferring mechanism for bar-shaped products, a conveyor, a carrier for delivering a predetermined number of the articles at a time to said conveyor and depositing the same thereon, said carrier including a movable support on which the objects are rested while being carried, means for lowering said support when the carrier is in a depositing position to thereby cause the carrier to release the objects and permit the same to be deposited on the conveyor, and means for preventing complete lowering movement of said carrier when an insufficient number of articles is carried thereon, whereby a release of said insufficient number of articles to the conveyor is prevented.

4. In a transferring mechanism for bars of butter and the like, a conveyor, a carrier vertically reciprocable above the same, a pair of movable arms on the carrier, rollers on said arms and on which the bars are carried, cam means for moving the arms either toward one another or for separating the same to cause said arms when in separated position to release the bars from the rollers and permit the bars to be deposited on the conveyor, and means controlled by one or more bars on the arms for rendering the cam means ineffective to operate the arms when one or more bars is carried upwardly by the carrier.

5. In an apparatus for transferring bar-shaped articles, a conveyor, a carrier vertically reciprocated above the conveyor, a pair of pivotally-mounted article-supports on the carrier, cam means operative to move said article-supports to or from one another to thereby cause the same to either support or release a group of the bar-shaped articles, said cam means being normally operative to move the article-supports to spread-apart article-releasing position when the carrier reaches a position of descent to thereby deposit such articles on the conveyor, and means controlled by articles improperly positioned on the carrier for rendering the cam means ineffective to move the article-supports to spread-apart article-receiving position when one or more articles is resting on the article-supports at the time the carrier ascends.

6. In an apparatus as provided for in claim 7, wherein the cam means consists of a pair of pivoted plates provided with cam slots, the article-supports being pivotally movable to and from one another and having elements disposed in said cam slots, and spring means normally operative to move the plates toward one another and maintain the same in operative relationship, said spring means permitting separating movement of the plates to cause the same to become inoperative upon the application of pressure on the arms by a butter bar carried upwardly by the carrier.

7. In an apparatus of the character described, a partitioned conveyor adapted to receive predetermined numbers of articles between its partitions, a transferring device for receiving such predetermined numbers of articles from a source of supply located above the conveyor and carrying the articles downwardly and depositing them between the partitions on the conveyor, said transferring device including a vertically reciprocable carrier having pivotal arms carrying bars upon which the articles are transported, means for swinging the arms apart when the carrier is lowered to a position adjacent to the conveyor to thereby cause release of the articles and causing the same to fall into position between the partitions of the conveyor, said means being operative to bring the arms toward one another when the carrier is in its elevated position away from the conveyor, said means comprising pivoted means formed with a cam slot and projection on at least one of the arms entering said slot, feeler means on the carrier for receiving the pressure of the articles received on the carrier, and means actuated by said feeler means for preventing complete descent of the carrier when less than a predetermined number of articles is urged in contact with said feeler means.

8. In an apparatus of the character described, a carrier for receiving a plurality of butter bars, said carrier including a pair of swinging arms each carrying a roller at its end and on which the butter bars are supported, cam means for swinging the arms apart to cause the same to release the butter bars or else to bring the arms together into bar-supporting position, means for rendering the cam means ineffective to spread the arms apart when a bar is carried upwardly by the carrier, a support on which the bars are delivered for reception on the carrier when the carrier is in an elevated position, and means for preventing feeding movement of the bars along the support and into the carrier while the carrier is in a lowered, discharge position.

9. In a transferring device for butter bars and the like, a vertically reciprocable carrier, a conveyor operative below the carrier, delivery means for feeding bars to the carrier, a shield carried by the carrier and preventing the delivery of bars thereto while the carrier is in a lowered position, a roller beneath which the bars are moved in entering onto the carrier, said roller acting to prevent elevating movement of the bars as the shield is elevated past said bars, the carrier including a pair of movable arms carrying freely-rotatable rods at their ends and on which the bars are delivered by said delivery means, cam means by which said arms are moved toward or away from one another to either support the bars on said rods or else release the bars, feeler means engaged by the bars to thereby indicate the presence of a predetermined number of the bars on the carrier, and means controlled by said feeler means to thereby prevent descent of the carrier when the carrier attempts to descend with less than a predetermined number of bars carried by it.

10. In an apparatus for handling butter bars and the like, a vertically reciprocated bar-carrier, means by which said carrier is vertically reciprocated, the carrier being composed of a plurality of units each of which receives and carries a predetermined number of bars, feeler means against which the bars fed to each unit are brought into contact as the bars are delivered into the carrier, and means controlled by said feeler means for preventing movement of the carrier to depositing position when less than a predetermined number of the bars is carried by either unit of the carrier and said carrier attempts to move to depositing position.

11. In an apparatus for handling butter bars and the like, a vertically reciprocated bar carrier, means by which the carrier is vertically reciprocated, the carrier being composed of a plurality of units each of which receives and carries a predetermined number of bars, pivoted arms on each unit, cam means for pivotally moving said arms to cause the same to release the bars adjacent to the lowest point in descending movement of the carrier, feeler means against which the bars fed to each unit are brought into contact as the bars are delivered into the carrier, means controlled by said feeler means for preventing descending movement of the carrier to depositing position when less than a predetermined number of the bars is carried by either unit of the carrier and the carrier attempts to move to descending position, and means by which the cam means is rendered ineffective to move the pivoted arms when the carrier ascends with one or more of the bars carried by it.

12. In an apparatus for handling butter bars, a carrier having a pair of pivoted arms on which butter bars are carried downwardly to a depositing position, cam means for causing opening and closing movements of the arms whereby said arms will be opened at the end of the descent of the carrier and closed when the carrier reaches the top of its ascent, and means by which the cam means is rendered ineffective to move the pivoted arms when the carrier ascends with one or more bars positioned between its arms.

13. In an apparatus as provided for in claim 14, wherein the cam means consists of a pair of pivoted, slotted plates, the arms having projecting pins entering the slots in said plates and being controlled thereby, and spring means holding the cam plates in operative camming relation, said spring means permitting the plates to be pivotally urged to inoperative position by the arms when a bar is improperly positioned between the arms and the carrier ascends with the bar so positioned.

14. In an apparatus for handling butter bars and the like, a conveyor, a carrier vertically reciprocated above the same, said carrier receiving a predetermined number of bars while in an elevated position and then descending to a lowered position adjacent to the conveyor and depositing the bars thereon, means for preventing the descent of the carrier to depositing position when less than a predetermined number of bars is on it, and means for preventing the carrier from receiving a charge of bars if it is improperly holding an undeposited bar inadvertently carried upward after its previous depositing movement.

ROBERT W. CLAUSS.

References Cited in the file of this patent

UNITED STATES PATENTS

| Number | Name | Date |
|---|---|---|
| 1,257,988 | Juengst | Aug. 13, 1918 |
| 1,489,892 | Loughridge | Apr. 8, 1924 |
| 1,718,443 | Straight | June 25, 1929 |
| 2,612,981 | Alden | Oct. 7, 1952 |